United States Patent [19]

d'Agostino et al.

[11] Patent Number: 4,681,327
[45] Date of Patent: Jul. 21, 1987

[54] COMPOUND SEAL WITH PRESSURE EQUALIZATION APERTURE

[75] Inventors: Guy d'Agostino, Vitry; André Dhainaut, Dammarie les Lys; Daniel G. A. Kettler, Chartrettes; Henry R. Leclerc, Juvisy sur Orge, all of France

[73] Assignee: Societe Nationale d'Etude et de Construction de Moteurs d'Aviation "S.N.E.C.M.A.", France

[21] Appl. No.: 934,831

[22] Filed: Nov. 25, 1986

[30] Foreign Application Priority Data

Nov. 25, 1985 [FR] France .................. 85 17745

[51] Int. Cl.$^4$ .............................................. F16J 15/10
[52] U.S. Cl. ...................................... 277/29; 277/165; 277/188 R; 277/221
[58] Field of Search ............... 277/28, 29, 165, 188 R, 277/188 A, 220-222

[56] References Cited

U.S. PATENT DOCUMENTS

| 1,479,089 | 1/1924 | Short . |
| 1,827,903 | 10/1931 | Panyard . |
| 3,057,630 | 10/1962 | Sneed . |
| 3,218,087 | 11/1965 | Hallesy . |
| 3,455,566 | 7/1969 | Hull et al. ................. 277/188 R X |
| 4,123,068 | 10/1978 | Van Gorder .................. 277/29 X |

FOREIGN PATENT DOCUMENTS

| 1101070 | 3/1961 | Fed. Rep. of Germany . |
| 589386 | 2/1924 | France . |
| 1113528 | 11/1954 | France . |
| 1435225 | 3/1965 | France . |
| 1509034 | 11/1966 | France . |
| 308842 | 2/1969 | Sweden ................. 277/188 R |
| 492080 | 9/1938 | United Kingdom ............... 277/221 |
| 974751 | 11/1964 | United Kingdom ............... 277/29 |
| 1012879 | 12/1965 | United Kingdom . |

Primary Examiner—Robert S. Ward
Attorney, Agent, or Firm—Bacon & Thomas

[57] ABSTRACT

A compound seal for affecting a seal on a translating shaft movable within a sleeve to separate high pressure and low pressure zones. The compound seal includes a sealing member and a clamping member disposed in a groove formed in one of the elements. The sealing member defines sealing sides which cooperate with one of the sides of the grooves and with the other of the elements. The clamping member cooperates with the bottom and the high pressure side of the groove, and with the sealing member so as to exert a force thereon extending substantially along the bisector of an angle defined by the sealing sides.

17 Claims, 14 Drawing Figures

COMPOUND SEAL WITH PRESSURE EQUALIZATION APERTURE

BACKGROUND OF THE INVENTION

The present invention relates to a seal between two components such as a sliding shaft and a surrounding sleeve to separate two chambers, such as annular sleeve chambers, supplied with fluids at different pressures.

It is often necessary to utilize a seal between a sleeve and a shaft which is slidably mounted in the sleeve so as to traverse along its longitudinal axis. The shaft may be actuated by the pressure differential between fluids applied to the ends of the shaft. Present seals suffer from the drawback that the sealing action between the shaft and the sleeve is achieved by radial friction between the sealing member against one or the other of the components. While such radial friction may be acceptable for a shaft rotating within the sleeve, it is not acceptable for a shaft which traverses along its longitudinal axis within the sleeve. In the latter case, it is more desirable to achieve the sealing effect by forcing the seal member against a radial side of a groove in which it is located.

French Pat. No. 1,113,528 discloses an O-ring seal located within a groove formed in the shaft and forced against the surrounding sleeve by a second, clamping O-ring. The two O-rings are separated by a metal grille which permits the fluid to pass into the groove such that the relatively high pressure of the fluid will contribute to the sealing force against the sleeve wall.

This seal has not entirely alleviated the aforementioned problems, since, being toroidal in shape, the seal rolls upon itself during shaft translation and, due to the high pressures in the groove, may degrade faster due to contact between it and the metal grille. Such a drawback may be acceptable when the seal is utilized as a piston packing, as shown in U.S. Pat. No. 1,479,089 to Short, but cannot be acceptable in those instances where the sliding shaft must operate with relatively low control pressures. Furthermore, these prior art seals rub against the cylindrical sleeve in direct proportion to the pressure in the high pressure chamber.

It is difficult, if not impossible, to utilize these devices on small diameter, translating shafts, especially when such shafts are controlled by relatively low control pressures compared to the pressures in the chambers which must be separated by the seal. Such applicability is even less in those cases where the pressure in one of the chambers is significantly higher than that in the other.

French Pat. No. 1,509,034 discloses a seal having sealing members with frusto-conical surfaces which mutually cooperate with each other and with an inner spring that forces the jamming member against the sealing member with a wedge effect. This provides radial compression of the sealing member against the cylinder surrounding the shaft and an axial pressure against a lateral side of the groove.

Although such a device is preferable to the previously described O-ring seal, since it provides an axial component of the friction force, it still requires a third member, in addition to the sealing and jamming members, to assure the compression of the jamming member against the sealing member. The three part sealing device, therefore, presents difficulties when required to seal small diameter shafts.

SUMMARY OF THE INVENTION

It is a primary object of this invention to provide a seal for a shaft which translates within a sleeve having a control pressure which is very much lower than the high pressure present in at least one of the annular chambers surrounding the shaft. The invention provides adequate sealing with a low leakage rate of less than 10 liters/h for a high pressure of about 80 bars, and wherein the translation control pressure on the shaft is approximately 2.5 bars. The seal according to the invention provides a friction applied to the shaft that will not exceed a force of 1-5 daN for a pressure of approximately 80 bars.

Another objection of the invention is to provide a seal which will achieve the aformentioned operational parameters while at the same time having only two parts so that it may be utilized with shaft diameters not exceeding 30 mm and having a groove depth and width not exceeding 5.5 and 6 mm, respectively.

The compound seal according to the invention comprises a first sealing side cooperating with a low pressure side of an annular groove formed in either the shaft element or the sleeve element and a second sealing side cooperating with the element not having the annular groove, and at least a third side which extends substantially perpendicular to the bisector of an angle subtended by the first and second sealing sides. A clamping member bears against the third side so as to apply a force thereto which is directed substantially along the bisector. At least one aperture is defined by the sealing member so as to equalize the high pressure fluid on both sides of the clamping member.

The second side of the sealing member may define an annular recess which communicates with the high pressure zone so as to increase the radial friction between the seal member and the element against which the second side bears.

In a first embodiment of the invention, the high pressure side of the annular groove extends substantially perpendicular to the longitudinal axis of the shaft. The low pressure side of the annular groove extends at an angle $\beta$ of between 15° and 30° with respect to a plane extending perpendicular to the longitudinal axis of the shaft element.

The sealing member may comprise a polytetrefluoethylene (Teflon) based annular member having a generally trapezoidal cross-section in which the longer of the parallel sides constitutes the second sealing side, one of the oblique sides comprises the first sealing side and wherein the other of the oblique sides comprises the third side. The second sealing side may define the annular recess so as to minimize its frictional force and at least one aperture is provided in the third side such that the high pressure fluid may equalize on either side of the clamping member.

In other embodiments, the sealing member may have a cross-section which is symmetrical with respect to the bisector of the angle subtended by the first and second sides. Such a cross-section may be defined by an annular rib defining the first and second sealing sides, and a flange attached thereto which defines the third side. At least one aperture is formed in the flange and the annular rib to allow the high pressure to equalize on either side of the clamping member.

DETAILED DESCRIPTION OF THE PREFERRED EMBODIMENTS

Figure 1:
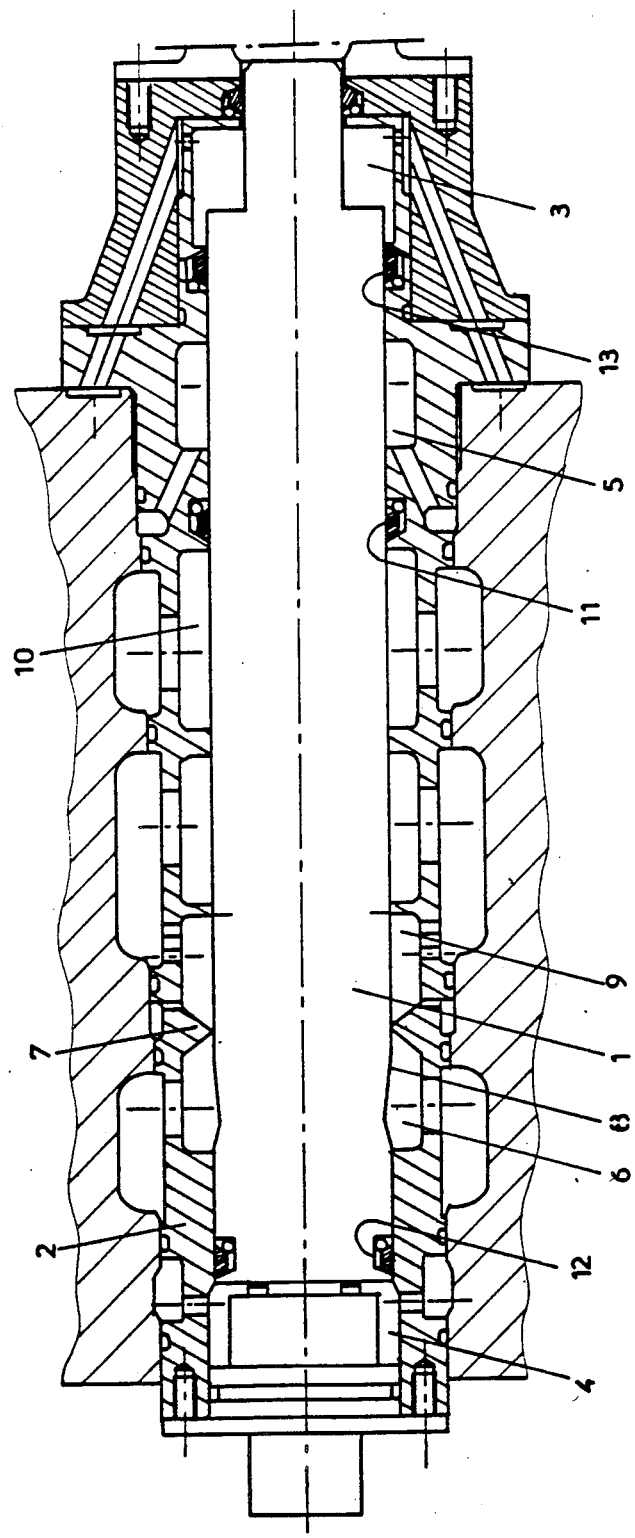
FIG. 1 is a partial, cross-sectional view of a fuel-metering valve for a turbojet engine incorporating the seals according to the present invention.

FIG. 1 shows a turbojet engine fuel metering valve wherein the shaft 1 of the metering unit translates within a sleeve 2 due to the differential pressure of control fluids applied to end chambers 3 and 4. The control fluid pressures may range from 2.5 to 15 bars in such a manner that the actual pressure controlling the translation of the shaft 1 is approximately 2.5 bars. The metering unit may be supplied by a pump with a high pressure fluid wherein the pressure varies within annular chamber 5 between 15 and 55 bars.

The fuel flow from the metering unit is discharged at the outlet of chamber 6 at a pressure $P_2$ varying from 2.5–55 bars due to the cooperation between a constriction 7 formed in the sleeve and a frusto-conical surface 8 formed on the shaft 1. The fluid is metered by this constriction from a chamber 9 at a pressure $P_1$ varying in the same range as a function of the control pressures applied to chambers 3 and 4. The annular chamber 10 is pressurized at a lower pressure at approximately 2.5 bars.

It is apparent that the pressure differences between the chamber 5 and 10; 6 and 4; or 5 and 3 may be approximately 50 bars. The seals 11, 12 and 13 between the sleeve and the shaft must tightly separate the various chambers such that the leakage rate does not exceed 10 liters/h, while the radial forces exerted on the shaft must be slight so as not to hinder the translation of the shaft by the low pressure control fluids.

Figure 2:
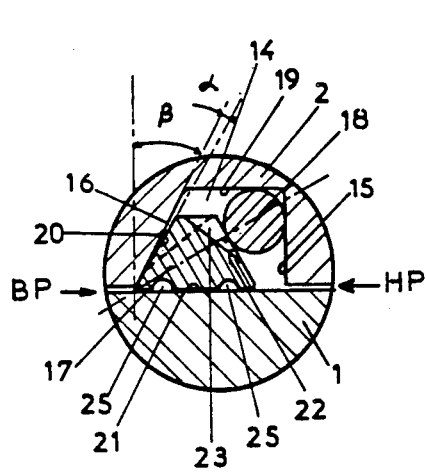
FIG. 2 is a partial, cross-sectional view showing a first embodiment of the compound seal according to the invention.

A first embodiment of the compound seal according to the invention is shown in FIG. 2 and is mounted in groove 14 formed in the sleeve 2. Although the invention will be described with a groove formed in the sleeve 2, it is to be understood that the groove could also be formed in the shaft element 1. Groove 14 is defined by high pressure side 15 which may extend in a plane substantially perpendicular to the longitudinal axis of shaft 1, a low pressure side 16, which may subtend an angle $\beta$ of between 15° and 30° with a plane extending normal to the axis of the shaft 1, and a bottom 19. The compound seal comprises an annular sealing member 17, which may be fabricated from a Teflon based material, and a clamping member 18, which may comprise an O-ring. The clamping member 18 bears against the high pressure side 15 and the bottom 19 of groove 14, and also bears against third side 22 of sealing member 17.

In this particular embodiment, sealing member 17 has a trapezoidal shape such that a first sealing side 20 is defined by one of the oblique sides of the trapezoid which seals against low pressure side 16 of groove 14. The longer of the parallel sides of the trapezoid constitutes the second sealing side 21 and bears against the cylindrical surface of the shaft 1. The third side 22 is defined by the other oblique surface of the trapezoid and cooperates with O-ring 18 to assure that the sealing member 17 will effectively seal against low pressure side 16.

In order to decrease the radial force exerted by the sealing member 17 on the shaft 1, third side 22 is oriented substantially perpendicular to the bisector of the angle subtended by first sealing side 20 and second sealing side 21. This ensures that the force exerted on the sealing member 17 by O-ring 18 extends substantially along the bisector and that the axial component of this force is larger than its radial component. In order to prevent the high pressure fluid entering the annular groove 14 from affecting the clamping force, the sealing member 17 defines apertures 23 and 24 in sides 20 and 22 so as to equalize the forces generated by the high pressure fluid on both sides of clamping member 18.

The axial component of the force exerted on the sealing member 17 by the clamping member 18 may be increased by orienting the third side 22 such that it does not extend perpendicular to the bisector of the angle subtended by sides 20 and 21. Also, the axial sealing force may be concentrated on the angle of sides 20 and 21 by providing an offset angle $\alpha$ of approximately 1°–3° between side 20 and low pressure side 16 of annular groove 14.

Sealing member 17 defines at least one annular recess 25 on side 21 which is in contact with the shaft element 1. Annular recess 25 communicates with the high pressure fluid due to the film of such fluid formed on the outer surface of the shaft 1 so as to minimize the frictional contact between the sealing member 17 and the shaft 1. The action of the high pressure fluid on annular recesses 25 also serves to increase the wedging effect between the sealing member 17 and groove 14.

Figure 2A:
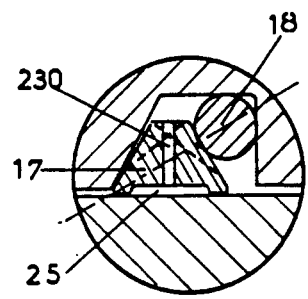
FIG. 2a is a partial, cross-sectional view of a second embodiment of the compound seal according to the invention.
Figure 2B:
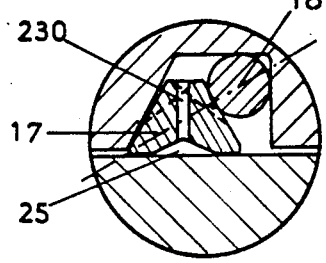
FIG. 2b is a partial, cross-sectional view of a third embodiment of the compound seal according to the invention.

In the embodiments shown in FIGS. 2a and 2b, the annular recess 25 has been widened and connected by ducts 230 to an upper part of the sealing member such that high pressure fluid will more easily fill the annular recess 25 in order to further decrease the radial force exerted on the shaft 1 by the sealing member 17.

Figure 3:
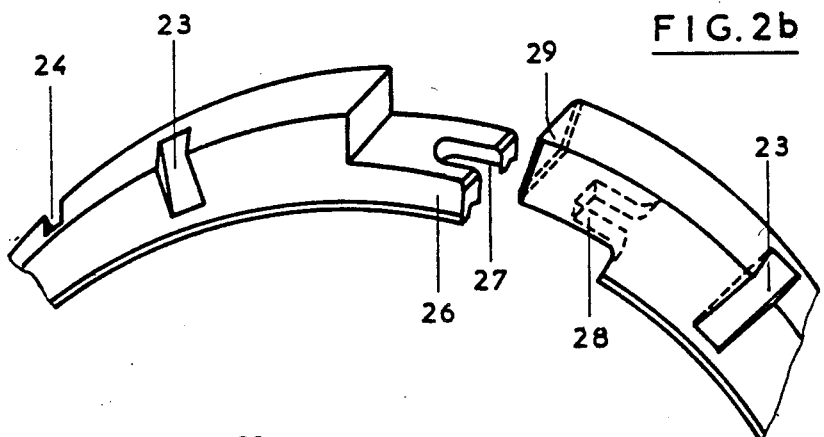
FIG. 3 is a partial, perspective view showing the bayonet joint for the sealing member according to the invention.

The sealing member may be formed with opposite ends joined together by a bayonet joint, as shown in FIG. 3. The two ends overlap so as to form a radial bayonet joint in which the radially inner portion 26 has a central mortise 27 which cooperates with a tenon 28 located below the outer portion 29 formed on the other end of the sealing member 17. This forms a double axial bayonet when the ends are fastened together.

The thusly formed sealing member is symmetrical and thereby eliminates the need for any particular polarizing orientation during assembly. Also, due to the elasticity from the bayonet joint, it may be fabricated of somewhat stiff material, such as Teflon, while providing a complete seal about substantially the entire circumference of the shaft, the only gap being between the adjacent ends.

Figure 4:
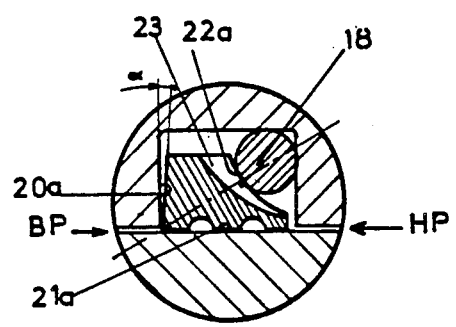
FIG. 4 is a partial, cross-sectional view of a fourth embodiment of the compound seal according to the invention.
Figure 5:
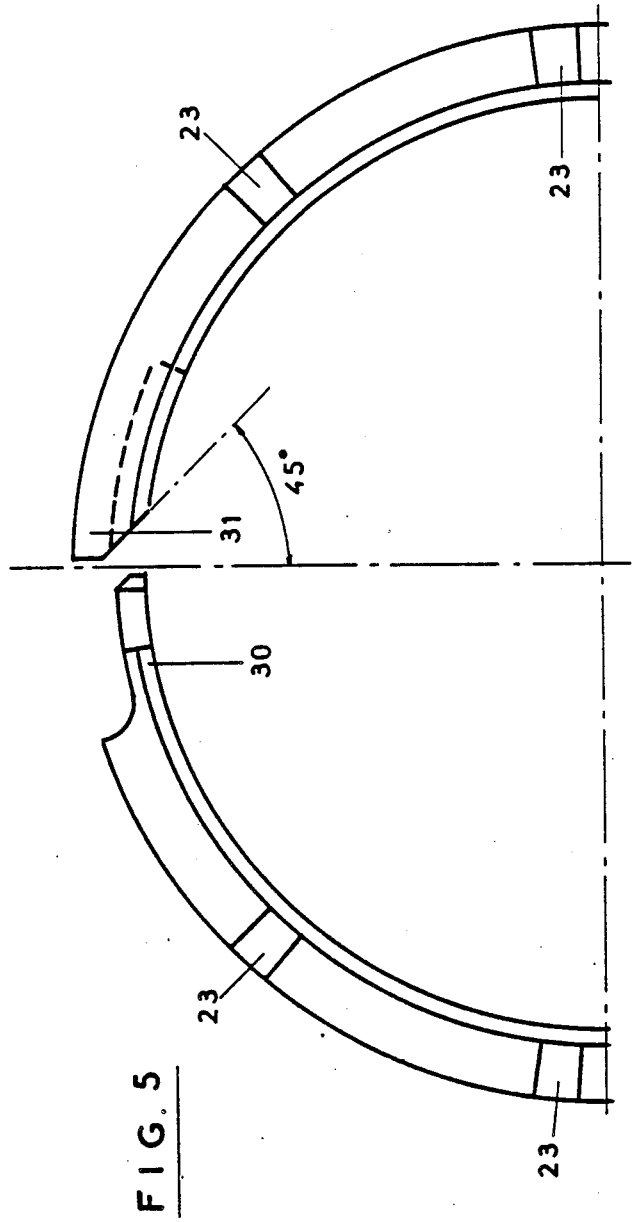
FIG. 5 is a partial, front view of the sealing member shown in FIG. 4.
Figure 6:
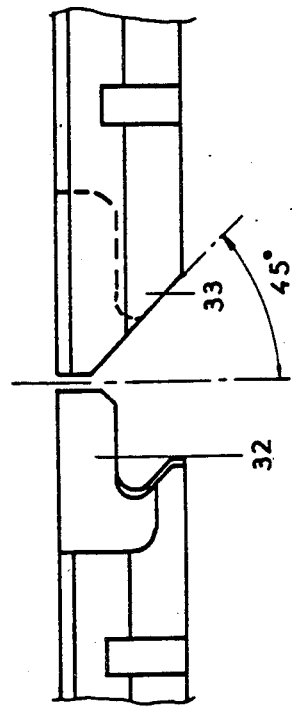
FIG. 6 is a partial, top view of the sealing member shown in FIG. 5.

FIGS. 4–6 show a variation on the form of the sealing elements 17 for use in an annular groove in which the high pressure and low pressure sides both extend substantially perpendicular to the longitudinal axis of the shaft. In this variation, the sealing element 17 is no longer symmetrical and side 22a, which cooperates with the clamping O-ring 18, defines a concave surface. The interaction of the O-ring 18 with the concave surface 22a is such that the resultant of the forces passes along the bisector of the angle subtended by first sealing side 20a and second sealing side 21a. The sealing member 17 may also be designed using a conical side 20a to bear against a semi-conical groove as illustrated in FIG. 2. As in the previously described embodiments, apertures 23 allow the high pressure to equalize on both sides of the clamping member 18.

FIGS. 5 and 6 show the joint between the ends of the sealing member described in FIG. 4. The ends are spliced together by means of two single bayonet joints, the radial bayonet joint denoted by elements 30 and 31, and the axial bayonet joint denoted by elements 32 and 33.

Figure 7:
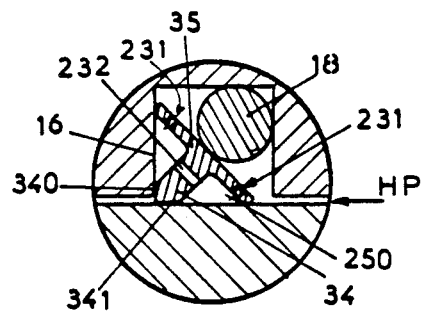
FIGS. 7–11 show the compound seal according to the invention having variously shaped sealing members.
Figure 8:
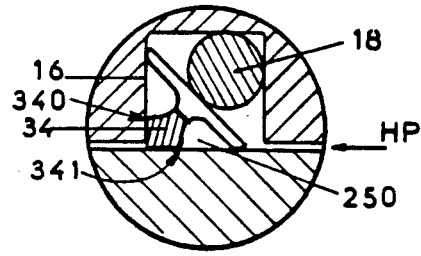
Figure 9:
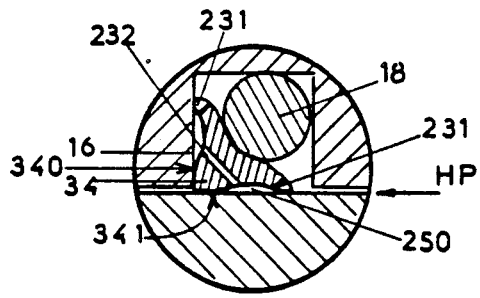
Figure 10:
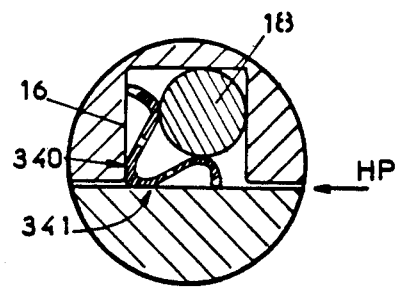

FIGS. 7–9 show various embodiments of the sealing member wherein such member is symmetrical about the bisector of the angle subtended by the first and second sealing sides. The sealing member is defined by annular rib 34 which defines first sealing side 340 and second sealing side 341, and a flange 35 attached thereto which extends substantially perpendicular to rib 34 and defines the third side which cooperates with clamping O-ring 18. Ducts 231 and 232 allow the high pressure fluid to flow around to the sides of the sealing member and into the annular chamber 250 in order to restrict the sealing contact to the first sealing side 340 and the second sealing side 341. In the embodiment shown in FIG. 10, the sealing member 17 is formed by a single corrugated ring having a generally "V" shaped cross-section with curved legs such that the base of the "V" forms the sealing contact with the low pressure side 16 of the annular groove, while the legs of the "V" cooperate with O-ring 18 to provide the clamping effect.

Figure 11:
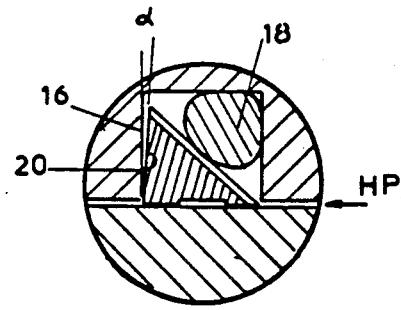

FIG. 11 shows a sealing member having a substantially triangular cross-section in which the first sealing side 20b defines an angle α with the low pressure side 16 of the annular groove.

Figure 12:
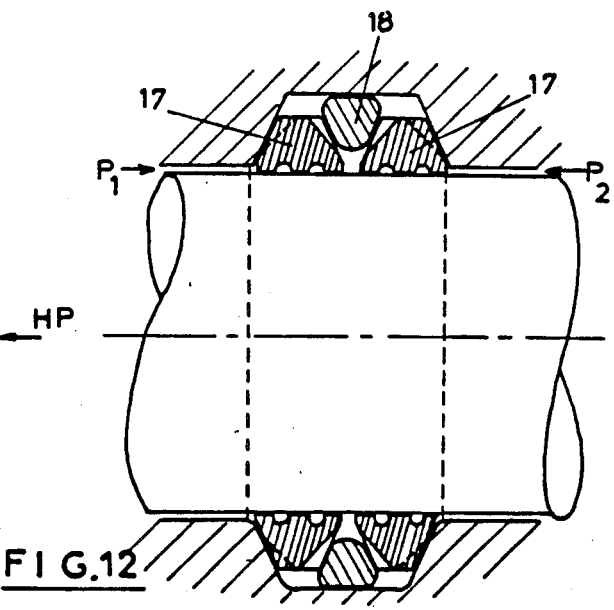
FIG. 12 is a partial, cross-sectional view showing the compound seal according to the invention incorporating a pair of sealing members.

FIG. 12 illustrates the use of a pair of sealing members 17 disposed on either side of a clamping member 18. This embodiment is utilized where high pressure is alternately applied to either side of the compound seal. The sealing members 17 may be identical with those shown in FIGS. 2, 2a or 2b and the annular groove 14 may define two conical walls. The clamping member O-ring 18 cooperates with the two opposite sides of the sealing members 17 and with the bottom of the annular groove. In this case, the sealing effect is alternately provided by either of the seal members on the low pressure side.

The compound seal according to the invention may be utilized with sealing members that are not split as long as other means are provided for assembling the components. This may be achieved by forming the seal members of a flexible material, or forming the groove in two separate parts which are affixed together after the seal members are assembled.

The foregoing description is provided for illustrative purposes only and should not be construed as in any way limiting this invention, the scope of which is defined solely by the appended claims.

What is claimed is:

1. A compound seal for effecting a seal between a shaft element having a longitudinal axis and a sleeve element wherein one of the elements is movable with respect to the other of the elements and defines a high pressure zone and a low pressure zone comprising:
    (a) an annular groove defined by one of the elements, the groove having a low pressure side, a bottom and a high pressure side;
    (b) a sealing member disposed in the annular groove, the sealing member having a first sealing side bearing against the low pressure side of the annular groove, a second sealing side bearing against the other of the elements and at least a third side extending substantially perpendicular to a bisector of an angle subtended by the first and second sides;
    (c) an annular clamping member bearing against the bottom and the high pressure side of the groove, and against the third side of the sealing member so as to exert a force on the sealing member in substantially the direction of the bisector so as to urge the first and second sides in sealing contact with the low pressure side and the other of the elements, respectively; and,
    (d) at least one aperture definded by the sealing member and extending in a generally radial direction on either side of the clamping member so as to allow equalization of pressure on either side of the clamping member.

2. The compound seal according to claim 1 further comprising an annular recess defined by the second side of the sealing member, the annular recess communicating with the high pressure zone so as to decrease the radial friction between the second side and the other of the elements.

3. The compound seal according to claim 1 wherein the first side of the sealing member and the low pressure side of the annular groove define an angle of between 1° and 3°.

4. The compound seal according to claim 1 wherein the high pressure side of the annular groove extends in a plane substantially perpendicular to the longitudinal axis of the shaft element.

5. The compound seal according to claim 1 wherein the low pressure side of the annular groove extends at an angle of between 15° and 30° to a plane extending perpendicular to the longitudinal axis of the shaft element.

6. The compound seal according to claim 1 wherein the clamping member comprises an O-ring.

7. The compound seal according to claim 6 further comprising an annular recess defined by the second side of the sealing member, the annular recess communicating with the high pressure zone so as to decrease the radial friction between the second side and the other of the elements.

8. The compound seal according to claim 7 wherein the first side of the sealing member and the low pressure side of the annular groove define an angle of between 1° and 3°.

9. The compound seal according to claim 8 wherein the high pressure side of the annular groove extends in a plane substantially perpendicular to the longitudinal axis of the shaft element.

10. The compound seal according to claim 9 wherein the low pressure side of the annular groove extends at an angle of between 15° and 30° to a plane extending perpendicular to the longitudinal axis of the shaft element.

11. The compound seal according to claim 2 wherein the sealing member has a substantially trapezoidal cross-sectional shape such that the longer of the parallel sides comprises the second sealing side, one of the oblique sides comprises the first sealing side and the other of the oblique sides comprises the third side.

12. The compound seal according to claim 11 wherein the third side is concave.

13. The compound seal according to claim 11 wherein the sealing member has opposite ends joined together by a bayonet joint to retain it in an annular shape.

14. The compound seal according to claim 13 wherein the joint is an axial bayonet joint.

15. The compound seal according to claim 13 wherein the joint is a radial bayonet joint.

16. The compound seal according to claim 1 wherein the sealing member has a cross-sectional shape which is symmetrical about the bisector of the angle subtended by the first and second sealing side.

17. The compound seal according to claim 16 wherein the sealing member comprises:
    (a) an annular rib defining the first and second sealing sides; and,
    (b) a flange attached to the annular rib and defining the third side.

* * * * *

UNITED STATES PATENT AND TRADEMARK OFFICE
CERTIFICATE OF CORRECTION

PATENT NO. : 4,681,327
DATED : July 21, 1987
INVENTOR(S) : D'AGOSTINO ET AL.

It is certified that error appears in the above—identified patent and that said Letters Patent is hereby corrected as shown below:

Col 2, lines 48-49, "polytetrefluoethylene" should be --polytetrefluoroethylene--.

Signed and Sealed this

Eighth Day of December, 1987

Attest:

DONALD J. QUIGG

*Attesting Officer*　　　　　*Commissioner of Patents and Trademarks*